(12) United States Patent
Deffenbaugh

(10) Patent No.: US 9,957,958 B2
(45) Date of Patent: May 1, 2018

(54) RECIPROCATING INTEGRAL LINEAR ENGINE COMPRESSOR

(71) Applicant: Southwest Research Institute, San Antonio, TX (US)

(72) Inventor: Danny M. Deffenbaugh, San Antonio, TX (US)

(73) Assignee: SOUTHWEST RESEARCH INSTITUTE, San Antonio, TX (US)

(*) Notice: Subject to any disclaimer, the term of this patent is extended or adjusted under 35 U.S.C. 154(b) by 222 days.

(21) Appl. No.: 14/964,820

(22) Filed: Dec. 10, 2015

(65) Prior Publication Data

US 2017/0167478 A1    Jun. 15, 2017

(51) Int. Cl.

| | | |
|---|---|---|
| *F02B 71/00* | (2006.01) | |
| *F02B 75/18* | (2006.01) | |
| *F04B 35/00* | (2006.01) | |
| *F04B 39/00* | (2006.01) | |
| *F04B 39/10* | (2006.01) | |
| *F04B 39/12* | (2006.01) | |
| *F04B 27/12* | (2006.01) | |
| *F02B 23/08* | (2006.01) | |
| *F02B 33/02* | (2006.01) | |
| *F02B 25/26* | (2006.01) | |
| *F02D 23/00* | (2006.01) | |

(52) U.S. Cl.
CPC ............ *F04B 35/002* (2013.01); *F02B 23/08* (2013.01); *F02B 25/26* (2013.01); *F02B 33/02* (2013.01); *F02D 23/005* (2013.01); *F04B 27/12* (2013.01); *F04B 39/0022* (2013.01); *F04B 39/10* (2013.01); *F04B 39/12* (2013.01)

(58) Field of Classification Search
CPC .......... F02B 23/08; F02B 25/26; F02B 33/02; F04B 35/002; F04B 27/12; F04B 39/0022; F04B 39/10; F04B 39/12; F02D 23/005; F02F 7/0009; F02G 2244/12
USPC ..................................... 123/53.6, 53.3, 46 R
See application file for complete search history.

(56) References Cited

U.S. PATENT DOCUMENTS

| | | | |
|---|---|---|---|
| 2011/0239642 A1* | 10/2011 | Schwiesow | ............. F02B 25/08 60/595 |
| 2014/0311167 A1* | 10/2014 | Hugenroth | ................ F25B 9/06 62/6 |

* cited by examiner

*Primary Examiner* — Syed O Hasan
(74) *Attorney, Agent, or Firm* — Livingston Law Firm

(57) ABSTRACT

A reciprocating compressor. A hollow cylinder tube contains a piston assembly having two pistons connected by a piston rod. At each end of the cylinder tube is an outer chamber between an end plate and an outer end of the proximate piston. These two outer chambers and the outer ends of the pistons define a power cylinder at each end of the cylinder tube. In the mid-portion of the cylinder tube, a center divider is situated between the pistons and has an aperture that allows the piston rod to reciprocate through it. The two inner chambers formed thereby and the inner ends of the pistons define two compression cylinders in the mid-portion of the cylinder tube. The two compression chambers share a suction manifold and a discharge manifold, but have independently operating suction and discharge valves.

6 Claims, 3 Drawing Sheets

RECIPROCATING INTEGRAL LINEAR ENGINE COMPRESSOR

TECHNICAL FIELD OF THE INVENTION

This invention relates to reciprocating compressors, and more particularly to cylinder configurations for such compressors.

BACKGROUND OF THE INVENTION

A reciprocating compressor is a type of positive-displacement compressor, and uses the movement of a piston within a cylinder to move gas from one pressure level to a higher pressure level. Intake gas enters a suction manifold, then flows into a compressor cylinder where it is compressed by a piston driven in a reciprocating motion via a crankshaft. The gas is then discharged via a discharge manifold.

Examples of applications of reciprocating compressors are for oil refineries, gas pipelines, chemical plants, natural gas processing plants and refrigeration plants. For these large compressors, groups of cylinders are operated in parallel.

Conventional reciprocating compressors, especially the large compressors used for natural gas pipelines, have a number of limitations in regard to emissions, efficiency and reliability. These conventional reciprocating compressor fall into two general types: integrated and separable.

"Integrated compressors" are those in which the compressor cylinders and power cylinders are combined in a single integral machine. Both sets of pistons are connected to a single crankshaft via a piston rod. These integral machines run at relatively slow speeds in order to optimize the system efficiency of the combined compressor and power cylinders.

"Separable compressors" are those in which the compressor unit is separated from a power-producing unit, which may be an engine or electric motor. The two units are connected by a set of drive shafts and couplings. The purpose of this configuration is to take advantage of modern emissions control technology for the engine power cylinders. These units run at higher speeds, and the power cylinders run at a little higher efficiency. However, the higher speeds create higher gas velocities in the compressor cylinders, which results in lower compressor cylinder efficiencies.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a multi-cylinder unit for a reciprocating compressor. As explained below, a single housing with one bore contains two reciprocating pistons, but defines four chambers. Two outer chambers are each served by an outer end of a piston, and two inner chambers are each served by an inner end of a piston. The pistons are connected in the mid portion of the bore with a piston rod, which does not use a crankshaft.

With the above described configuration, the two outer chambers, the two inner chambers, and the two pistons define four cylinders. Two outer cylinders are power cylinders and two inner cylinders are compression cylinders.

For purposes of this description, the above described configuration is referred to as a "multi-cylinder compressor". It should be understood that a number of these compressors may be used together as "compressor units" to form a larger compressor machine.

Figure 1:
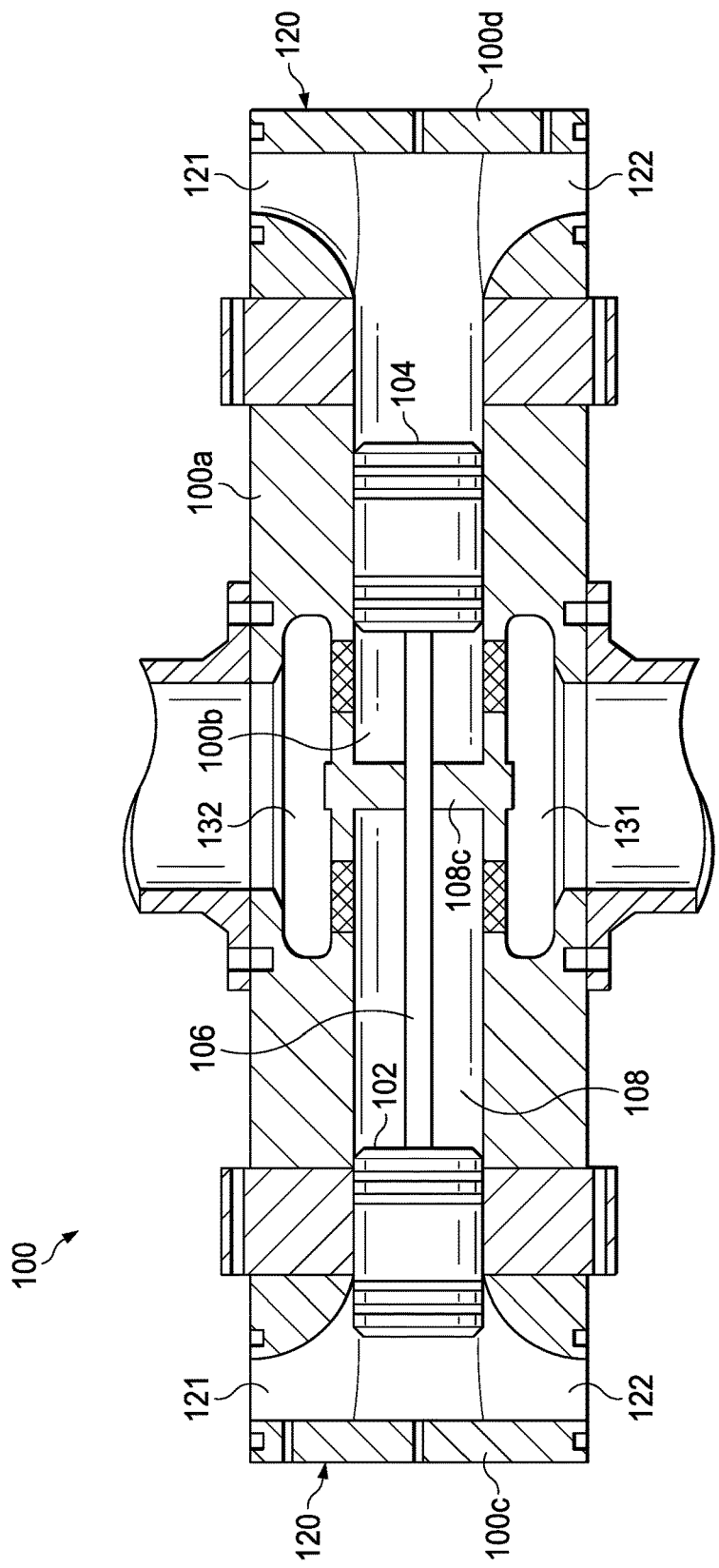
FIG. 1 illustrates a multi-cylinder linear integrated compressor in accordance with the invention.

FIG. 1 illustrates the multi-cylinder compressor 100 in accordance with the invention. A hollow tube 100a has a central bore 100b having an inner diameter slightly larger than the diameter of two pistons 102 and 104 that reciprocate within the bore.

At their inboard ends, pistons 102 and 104 are connected with a rigid piston rod 106. As explained below, pistons 102 and 104 move in unison due to their connection with piston rod 106, and these elements are referred to herein as a "piston assembly".

Central bore 100b is sealed closed at both ends, with end plates 100c and 100d. Because compressor 100 has a sealed housing comprising tube 100a and end plates 100c and 100d, there is no piston rod packing exposed to the external environment. Pistons 102 and 104 may have conventional piston rings and other means for providing a sealed reciprocating operation within their respective cylinders in the manner described below.

A center divider 108c divides the portion of bore 108 that is between the two pistons. Center divider 108c has a center aperture that allows piston rod 106 to reciprocate through divider 108c. The reciprocating movement of piston rod 106 through center divider 108c is sealed, such that as explained below, the two inner chambers can maintain different pressures.

As a result of the above structure, compressor 100 has four cylinder chambers. Two outer chambers are defined between the outer ends of pistons 102 and 104 and end plates 100c and 100d, respectively. Two inner chambers are defined by the center divider 108c and the inner ends of pistons 102 and 104.

The outer chambers are combustion chambers. In other words, the outer ends of pistons 102 and 104 each operate within one of two outer combustion chambers. These head ends of the pistons define two power cylinders, referred to herein as PC-1 and PC-2.

Each power cylinder PC-1 and PC-2 has a spark ignitor 120, an air intake valve 121, and an exhaust valve 122. Although not explicitly shown, the igniter and valves may be implemented with conventional devices used for spark-ignition engines. Various known valves and igniters operable to charge the power cylinders with an air-fuel mixture, to ignite the mixture, and to discharge exhaust gas may be used.

The inner chambers are compression chambers. In other words, the inner ends of pistons 102 and 104 each operate within one of two inner compression chambers. These inner ends of pistons define the compression cylinders, referred to herein as CC-1 and CC-2.

The compression cylinders CC-1 and CC-2 receive process gas via a suction line and shared suction manifold 131. The compressed gas exits via a shared discharge manifold 132 and a discharge line.

Each compression cylinder CC-1 and CC-2 has a suction valve within the suction manifold 131 and a discharge valve within the discharge manifold 132.

As explained below, compressor 100 allows the use of active or semi-active valves. These valves may be high-lift and low-pressure-drop valves that overcome limitations of passive compressor valves.

As indicated above, in application, a large reciprocating compressor may be implemented with multiple units of compressor 100. Improved synchronization made possible with multiple identical units 100 allows improved pulsation cancellation strategies and simplifies pulsation control. The speed or reciprocating frequency can be selected to optimize system efficiency.

Figure 2:
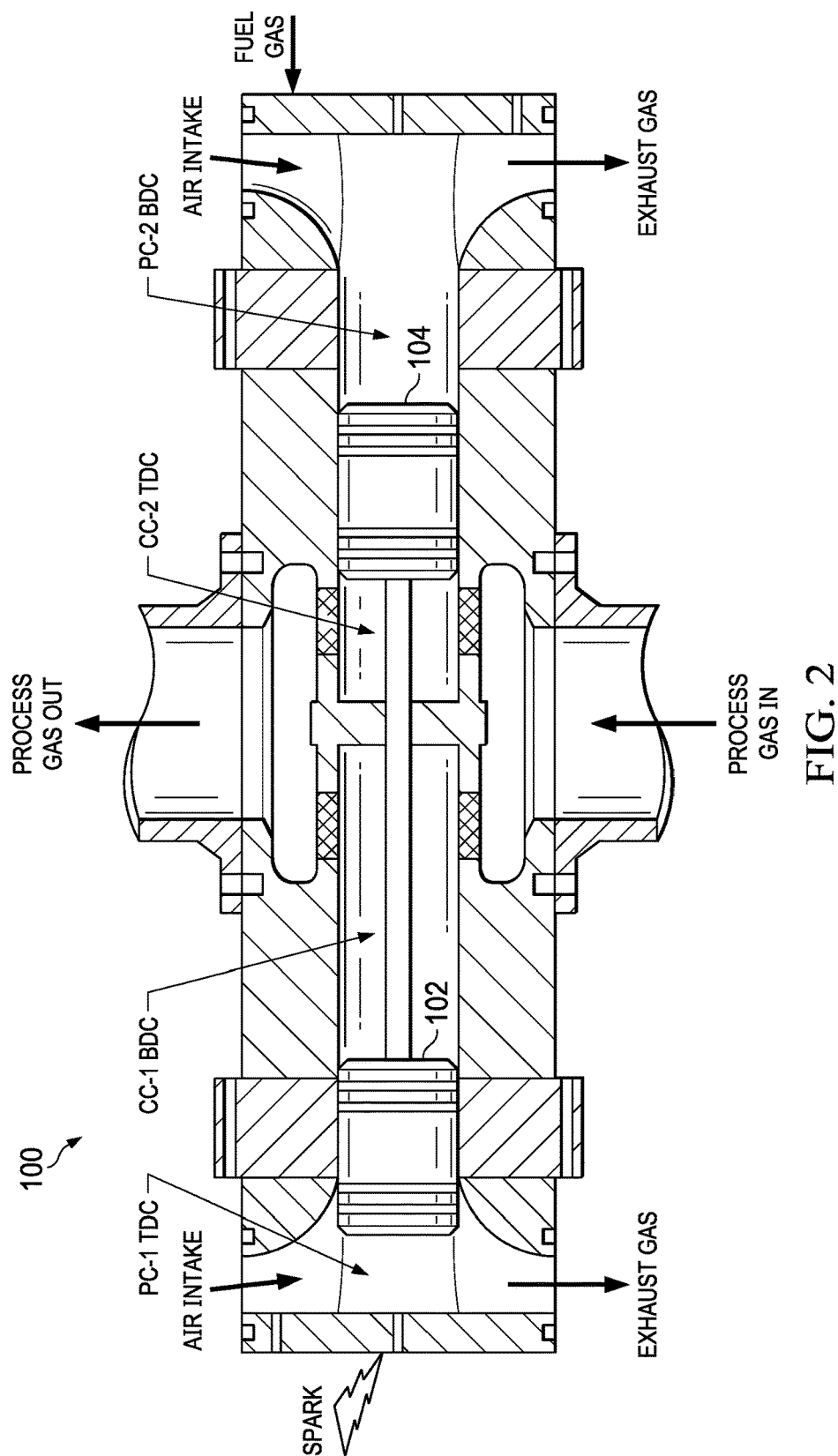
FIG. 2 illustrates the working cycle of the compressor of FIG. 1.

FIG. 2 illustrates compressor 100, with further illustration to indicate its working cycle. A working cycle of compressor 100 begins as illustrated in FIG. 2. Power cylinder 1 (PC-1) is at top dead center (TDC). The air-fuel mixture introduced into the chamber of PC-1 is ignited by a spark plug, which causes the hot gas mixture to expand, thus creating a force on the piston 102 to drive PC-1 towards its bottom dead center (BDC).

This movement of piston 102 (and the entire piston assembly) compresses the process gas in compressor cylinder 1 (CC-1) and simultaneously compresses the air-fuel mixture in power cylinder 2 (PC-2) as PC-2 approaches top dead center (TDC). This in turn drives the compressor cylinder 2 (CC-2) towards bottom dead center (BDC), which would draw in new process gas. When PC-2 reaches top dead center (TDC), a second spark plug ignites the air fuel mixture and drives piston 104 back to PC-1 top dead center (TDC) and PC-2 to bottom dead center (BDC) simultaneously.

This "pitch-catch" process drives the piston assembly (pistons 102 and 104 connected by rod 106) between the PC-1 top dead center (TDC) position and the PC-2 top dead center (TDC) position. All power cylinder and compressor cylinder valves are actively timed to control the reciprocating speed of the piston assembly.

In accordance with the above-described working cycle, the two compression cylinders have different low pressure portions of the cycle and different high pressure portions of the compressor cycle. Although the compressor cylinders have a shared suction manifold and a shared discharge manifold, each compressor cylinder has an independently operating suction valve and an independently operating discharge valve. Its suction valve receives process gas during its low pressure portion of the cycle, and its discharge valve discharges process gas during its high pressure portion of the cycle.

Figure 3:
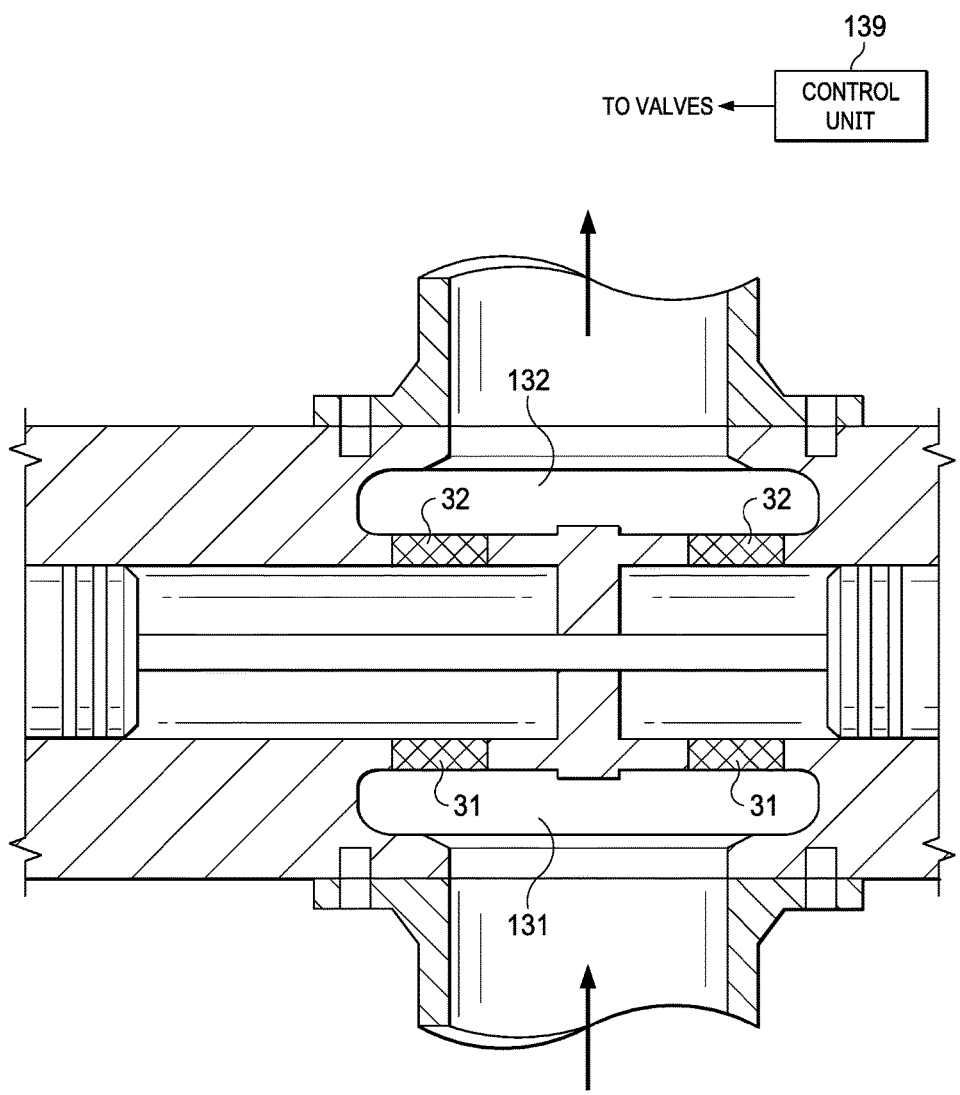
FIG. 3 illustrates the suction and discharge manifolds of the compressor in further detail.

FIG. 3 illustrates a portion of compressor 100, illustrating suction manifold 131 and discharge manifold 132 in further detail. The suction manifold 131 has two suction valves 31, one for each compression chamber. Each suction valve 31 communicates process gas into its associated compression chamber via the common suction manifold 131. Similarly, the discharge manifold 132 has two discharge valves 32, one for each compression chamber. Each discharge valve 32 communicates process gas out from its associated compression chamber via the common discharge manifold 132.

As stated above, the suction valves 31 and discharge valves 32 may be active or semi-active compressor valves. The basic operation of the valves 31 is to open to allow gas from the suction manifold 131 to enter the associated compression cylinder as the piston moves so as to enlarge the chamber. When the piston begins to move so as to make the chamber smaller (compressing the process gas), the suction valve 31 closes, trapping the gas inside the cylinder. As the piston continues to move, it compresses the gas, increasing its pressure. When the desired pressure is reached, the discharge valve 32 opens releasing higher pressure gas into the discharge manifold 132.

"Active" compressor valves are distinguished from passive compressor valves, the latter of which use a spring to passively return the valve to its closed position. In an active valve, the valve's opening and closing is actively controlled.

Active compression valves typically use solenoids as the actuation means. An example of a suitable active compression valve is that used with the HydroCOM™ control systems manufactured by Hoerbiger.

"Semi-active" compressor valves are referred to as such because although the valve still relies on gas forces for the valve to actuate, the valve senses and then controls the valve motion. For example, in a plate valve, electromagnetic actuators may be used to control the valve plate motion and create a soft landing at both the valve seat and guard using electromagnetic coils.

An example of a semi-active compressor valve is described in U.S. Pat. No. 7,762,521, entitled "Semi-Active Compressor Valve", to Klaus Brun et al, and assigned to Southwest Research Institute.

A feature of the invention is that the active or semi-active compressor valves 31 and 32 are synchronized with the power cylinder valves 121 and 122. As stated above, for the power cylinders PC-1 and PC-2, the intake and exhaust valves are implemented with active or mechanically driven valves.

The synchronization of the compressor valves 31 and 32 with the power cylinder valves 121 and 122 may be achieved with various methods. Referring again to FIG. 3, a control unit 139 has appropriate processing hardware and software to implement these various methods. Control unit generates control signals to the compressor valves 31 and 32.

Some synchronization methods may be implemented mechanically. For example, one synchronization method is to install compressor valves 31 and 32 that are similar to power cylinder valves 121 and 122. Various intake and exhaust valves for combustion cylinders, and means for actuating them are known in the art of internal combustion engines. All valves are driven off the same camshaft (not shown).

Other synchronization methods may be implemented with processor-based control strategy, using control unit 139. For example, compressor valves 31 and 32 may be implemented with active electro-mechanical valves. These valves are then triggered by the motion of the power cylinder valves 121 and 122. Power cylinder valve motion could trigger an input to control unit 139, which generates compressor valve signals.

Another processor-aided synchronization method is to implement the compressor valves 31 and 32 with semi-active valves. These valves are driven by the pressure difference between the compressor cylinder and the manifold. The pressure difference could be sensed, with input being delivered to control unit 139, which then generates compressor valve signals.

All three of these valve synchronization methods would have a clear flow path similar to the power cylinder valves. This clear flow path would have a significantly lower pressure drop than the current passive compressor valves by eliminating the complex torturous flow path that is common in the conventional passive compressor plate valve.

A further feature of compressor 100 is enhanced pulsation control capability. The sharing of manifolds 131 and 132, along with their active or semi-active valves, serves to shape the leading and trailing edges of the gas pulses and provide some smoothing and pulsation cancellation. When combined with multiple cylinders, this shaping, smoothing and cancellation would result in significant reductions in the flow pulses from the reciprocating motion of the pistons.

For pulsation control, the timing of the different cylinders is triggered to facilitate a smoothing and pulsation cancellation process. While conventional double-acting compressor cylinders attempt to use some cancellation to reduce pulsations, the swept volume of the head end and crank end cylinders are different by the volume of the piston-rod in the crank end cylinder. Compressor 100 does not have this limitation. Residual pulsations are reduced, thereby simplifying the required pulsation control system, which reduces the overall dynamic pressure drop and improves system efficiency.

In the embodiment of FIGS. 1 and 2, pistons 102 and 104 are each a single piece of generally uniform diameter. Alternatively, piston 102 and piston 104 could be each separated into two pieces with a short rod to reduce piston-travel overlap and to provide some isolation between the hotter power cylinder walls from the cooler compressor cylinder walls.

Active liquid cooling of the cylinder walls would facilitate isothermal compression, thereby improving the overall efficiency of the compressor cylinder and cooling to enhance the efficiency of the power cylinder as well.

In sum, advantages of the above-described compressor, are (1) elimination of a piston-rod packing assembly, (2) elimination of a crankshaft, (3) the ability to operate at an optimal speed range for the power/compressor cylinder combination, thus reducing excessive power requirements, and (4) enablement of advanced valves and advanced pulsation control technologies in order to reduce pressure drop, increase efficiencies, extend valve life, improve reliability, and dramatically reduce emissions.

What is claimed is:

1. A reciprocating compressor for moving a process fluid from a suction line to a discharge line, comprising: a hollow cylinder tube having a central bore; a piston assembly operable to reciprocate within the central bore, the piston assembly having two pistons and a piston rod, each piston having an outer end and an inner end, with the inner ends being connected with the piston rod; a pair of end plates, one end plate at each end of the cylinder tube, each end plate configured to provide a sealed outer chamber between the end plate and an outer end of the piston proximate to respective end plate; wherein each sealed outer chamber and the outer end of the proximate piston form a power cylinder; each power cylinder further comprising an igniter, an air intake valve, and an exhaust valve; a center divider in the central bore between the inner ends of the pistons, the center divider having an aperture operable to allow the piston rod to reciprocate through the center divider; wherein the inner end of each piston defines an inner chamber between each inner end and the center divider; wherein each inner chamber and the inner end of the proximate piston form a compression cylinder; wherein each compression cylinder further comprises a discharge valve and a suction valve; a common suction manifold shared by the suction valves of the compression cylinders; wherein each suction valve is in direct fluid communication from the respective compression cylinder to the common suction manifold; a common discharge manifold shared by the discharge valves of the compression cylinders; and wherein each discharge valve is in direct fluid communication from the respective compression cylinder to the common discharge manifold; wherein reciprocating movement of the piston assembly alternatingly opens and closes the suction valves such that the compression chambers alternatingly receive process fluid via the common suction manifold, and alternatingly opens and closes the discharge valves such that the compression chambers alternatingly discharge the process gas via the common discharge manifold.

2. The compressor of claim 1, wherein each piston is a single piece.

3. The compressor of claim 1, wherein each piston is two pieces connected by a short rod.

4. The compressor of claim 1, wherein the suction valves are active or semi-active valves.

5. The compressor of claim 1, wherein the discharge valves are active or semi-active valves.

6. The compressor of claim 1, further comprising a control unit operable to deliver synchronization signals to the valves of the power cylinders and the valves of the compression cylinders.

\* \* \* \* \*